United States Patent [19]
Lee

[11] Patent Number: 6,005,923
[45] Date of Patent: Dec. 21, 1999

[54] FULL FEATURED DATA ACCESS ARRANGEMENT FOR USE WITH MODEMS

[75] Inventor: Jeffrey Lee, Irvine, Calif.

[73] Assignee: Conexant Systems, Inc., Newport Beach, Calif.

[21] Appl. No.: 08/864,659

[22] Filed: May 28, 1997

[51] Int. Cl.$^6$ .................................................. H04M 11/00
[52] U.S. Cl. ............................ 379/93.09; 379/93.05; 379/106.08
[58] Field of Search ............................ 379/93.05, 93.09, 379/93.28, 106.08, 377, 382

[56] References Cited

U.S. PATENT DOCUMENTS

| | | | |
|---|---|---|---|
| 5,291,545 | 3/1994 | Stahl | 379/93.28 |
| 5,422,939 | 6/1995 | Kramer | 379/106.08 |
| 5,506,891 | 4/1996 | Brown | 379/377 |
| 5,519,767 | 5/1996 | O'Horo | 379/93.09 |
| 5,535,265 | 7/1996 | Suwandhaputra . | |

FOREIGN PATENT DOCUMENTS

WO 95/14344  5/1995  WIPO ........................... H04M 11/00

OTHER PUBLICATIONS

Silicon Systems K–Series Design Manual, pp. 6–11 to 6–18.

*Primary Examiner*—Curtis A. Kuntz
*Assistant Examiner*—Melur Ramakrishnaiah
*Attorney, Agent, or Firm*—Snell & Wilmer L.L.P.

[57] ABSTRACT

A full-featured data access arrangement (DAA) for connecting a modem to a public switched telephone network (PSTN) includes a bridge current loop circuit, a line in use detection circuit, an off hook relay, a loop current sense circuit, and an extension/remote event detector circuit. The off hook relay is connected in series with the current loop circuit to enable the DAA to detect external off hook and on hook events when the modem is in an on hook state. The DAA is configured to detect the off hook and subsequent on hook status of an extension telephone at a location even though the modem and a handset sharing a line connector with the modem are both in an on hook state. The DAA is also capable of detecting an off hook state of an extension telephone even though the modem is in an off hook state. In addition, the DAA can detect when a remote telephone device that initiates an incoming call is placed on hook.

21 Claims, 5 Drawing Sheets

FULL FEATURED DATA ACCESS ARRANGEMENT FOR USE WITH MODEMS

TECHNICAL FIELD

The present invention relates, generally, to data access arrangement (DAA) devices, sometimes referred to as direct access arrangement devices, for connecting a telephone device to a telephone network and, more particularly, to a full-featured DAA configured to support evolving telephony industry standards.

BACKGROUND ART AND TECHNICAL PROBLEMS

The Telecommunications Industry Association (TIA) and the Electronics Industry Association (EIA) from time to time promulgate non-binding technical standards for equipment sold in the telecommunications industry. While compliance with these standards by product manufacturers is generally voluntary, the practical importance of producing equipment in compliance with TIA/EIA standards is becoming increasingly important. In addition, the Federal Communication Commission (FCC) from time to time publishes binding regulations governing the telecommunications industry to ensure safety, compatibility, and to minimize problematic interference among various electrical devices and components sold in the telecommunications industry.

In particular, Part 68 of the FCC Guidelines, incorporated herein by this reference, relates to such matters as, for example, the requirement that telephones and other telephone devices be electrically isolated from the telephone network to prevent shock, fire, and other environmental hazards from effecting the users of such equipment. In this context, the term "telephone device" can refer to telephones, modems, personal computers (PCs), fax machines, telephone answering machines (TAM), and the like, which are typically connected to a telephone line through a conventional RJ-11 telephone jack.

Recently, TIA/EIA Standards Proposal No. 3131-A was approved and published as TIA/EIA-695 which relates to, inter alia, various functions to be supported by data access arrangement (DAA) devices, also commonly referred to as direct access arrangement devices. In particular, a DAA is a device which connects a telephone device, e.g., a modem, to an RJ-11 type jack, to thereby provide an interface between the modem and the Public Switched Telephone Network (PSTN). The DAA suitably includes an appropriate opto-electric or other isolation device to isolate the PSTN (which typically operates in the range of 42–200 volts) from the modem (which typically operates in the range of about 1 to 3 volts peak to peak). The transformer circuit within the DAA which performs this voltage step-down function is often referred to as the primary transformer, or simply as a "T1" device.

One of the principle functions of a conventional DAA surrounds the ability of the DAA to detect an incoming ring signal. When a ring signal is detected in a conventional telephone handset, the user can simply lift the telephone handset from the receiver, whereupon the telephone is said to go "off hook". Upon assuming the off hook position, the "off hook" relay within the DAA closes, thereby establishing a connection between the telephone handset and the telephone device which generated the incoming call. When the telephone call is finished and the user places the handset back onto the receiver, the handset is said to go back on hook, whereupon the off hook relay within the DAA is open, terminating the connection.

In a modem context, upon detection of a ring signal, the DAA may be configured to transmit a ring detect signal to a controller associated with the modem or with the PC with which the modem is associated, whereupon a control signal is applied to the DAA's off hook relay, closing the relay. Upon closure of the off hook relay, a data communications path is established between the modem and the telephone device which generated the incoming call.

Many modems in use today, particularly modems associated with PCs, also include a local handset connection, such that both the data modem and the telephone handset are connected to the telephone network through a single, shared RJ-11 phone jack or other interface device. In this context, it will be understood that the term "telephone handset" can include audio speakers, a headset, a voice activated speaker phone, a condenser microphone, or virtually any other audio configuration which permits voice or audio transmission. Moreover, it will also be understood in the context of the present invention that the term "local handset" or "local device" refers to a telephone or other device which shares a common RJ-11 type device with a modem, whereas the term "extension handset" or "extension device" refers to a telephone device which is connected to a common telephone line (for example, in another bedroom of the same home) but which has its own RJ-11 type phone jack (i.e., the extension telephone device does not share a common RJ-11 connection).

DAAs for use with a modem having a local handset are generally well-known, for example as described in Chapter 6 of the "K-Series Design Manual" published by Silicon Systems, the entire disclosure of which is hereby incorporated by this reference. Presently known DAAs, however, are unsatisfactory in several regards. For example, while a presently known DAA associated with a modem may detect an extension telephone device off hook condition while the modem is off hook, many known DAAs are unable to detect an extension device off hook condition while the modem is on hook. Moreover, to the extent a presently known DAA is able to detect when an extension device goes off hook while the modem associated with the DAA is on hook under certain circumstances, the DAA is unable to ascertain when the extension device goes back on hook.

A full featured DAA which overcomes the shortcomings of the prior art is thus needed.

The present invention provides a full-featured DAA for use with a modem which overcomes many of the shortcomings of the prior art.

SUMMARY OF THE INVENTION

The present invention provides methods and apparatus for interfacing a phone device with a telephone network in a manner which overcomes many of the shortcomings of the prior art.

In accordance with a preferred embodiment of the present invention, a DAA circuit is provided which detects when an extension telephone device goes off hook while the modem associated with the DAA is on hook, as well as detecting when the extension device goes back on hook. The ability of the subject DAA to detect when an extension device goes back on hook is particularly important, inasmuch as it permits a facsimile or other data packet which is desired to be transmitted to be queued and transmitted from the queue once the extension telephone device goes back on hook.

In accordance with a further aspect of the present invention, when the modem with which the DAA is associated is in the off hook condition, the DAA is configured to detect when an extension telephone device goes off hook, and to report this event to the user of the PC to which the modem is associated. In this way, the user can be informed that the modem connection has been terminated because of an extension off hook condition, as opposed to other common causes for modem disconnections, including internet service provider (ISP) failure, line failure, local hard drive failure, or the like.

In accordance with a further aspect of the present invention, when the modem is in the off hook condition, its associated DAA may be configured to detect when a remote telephone device (i.e., the telephone device from which an incoming telephone call has been placed) is hung up. This permits a modem, for example operating in the TAM mode, to terminate the connection when the remote telephone device hangs up, thus avoiding the familiar but annoying dial tone which is often inadvertently replayed by many TAM users when checking their telephone messages, as a result of the recording device associated with the answering machine commencing its recording sequence immediately before the calling party hangs up.

In accordance with a further aspect of the present invention, many of the foregoing functions may be conveniently implemented in software, thereby providing an efficient, low cost, TIA/EIA compliant DAA useful with current and future generation modems, including but not limited to the new 56 kbps modem technologies currently emerging, for example the new 56K modem chip sets produced by Rockwell Semiconductor Systems of Newport Beach, Calif.

BRIEF DESCRIPTION OF THE DRAWING FIGURES

The present invention will hereinafter be described in conjunction with the appended drawing figures, wherein like numerals denote like elements, and:

DETAILED DESCRIPTION OF PREFERRED EXEMPLARY EMBODIMENTS

Figure 1:
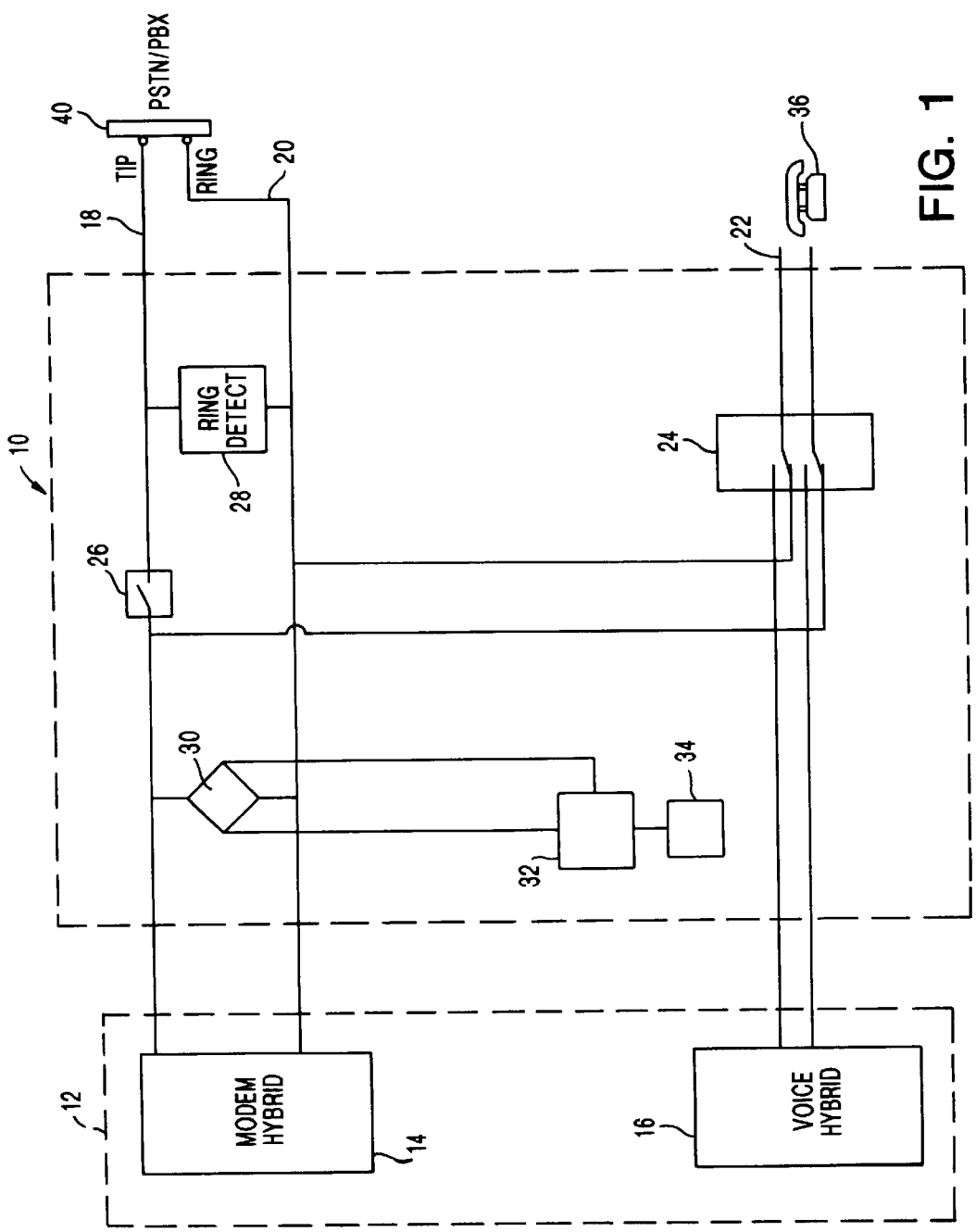
FIG. 1 is a schematic block diagram of an exemplary DAA circuit interconnecting a modem hybrid circuit with an incoming telephone line.

Referring now to FIG. 1, a conventional DAA 10 suitably connects a modem 12 to the Public Switched Telephone Network (PSTN), Private Branch Exchange (PBX), or the like. As is known in the art, the incoming signal from the PSTN/PBX is typically carried on a pair of "wires" referred to as the tip and ring lines 18 and 20, respectively. Thus, the tip-to-ring voltage is typically expressed as $V_{tr}$.

Modem 12 suitably comprises a modem hybrid 14 and a voice hybrid 16 to facilitate the transmission of both voice and data through the same modem 12. Although modem hybrid 14 and voice hybrid 16 are illustrated schematically in FIG. 1 as separate functional units, those skilled in the art will appreciate that the data and voice functions of modem 12 may suitably be integrated in any desired manner.

With continued reference to FIG. 1, a preferred embodiment of the present invention is suitably implemented in the context of a modem which includes a modem (or data) hybrid component and a voice hybrid component, such that the single modem can support data, facsimile, and other non-voice transmissions through incoming lines 18 and 20, as well as voice and other audio transmission through voice lines 22 associated with a local hand set 36. In this context, it will be understood that local handset 36 is connected to the PSTN through an RJ-11 type connector which the handset shares with DAA 10. In accordance with a particularly preferred embodiment, it will be appreciated that both voice and data is suitably transmitted to and from the PSTN through tip and ring wires 18 and 20.

More particularly, a voice relay circuit 24 is suitably configured to permit either the simultaneous transmission of voice and data through the implementation of the well-known SVD (simultaneous voice and data) function associated with conventional modems or, alternatively, voice relay 24 may be configured to permit a transmission of data only or voice only.

With continued reference to FIG. 1, a ring detect circuit 28 is suitably configured to detect the presence of an incoming "call" through the PSTN from a remote telephone device, i.e., a remote modem, fax machine, telephone handset, or the like. When an incoming call is detected, ring detect circuit 28 suitably sends a signal to modem 12, whereupon a signal may be applied to off hook relay 26 to thereby close the relay and accept the call. Once the call is accepted, the incoming AC signal is applied to modem 12, and a DC component of the incoming signal is transmitted through bridge circuit 30 to a DC current sink circuit 32. During a call connection, DC current sink 32 suitably consumes a DC component of the incoming signal sufficient in magnitude to permit the detection of the call connection by the local exchange carrier (LEC) or the local Central Office (CO). When the call is terminated, i.e., when off hook relay circuit 26 is again opened, the DC component transmitted through bridge circuit 30 is essentially terminated, allowing the CO to detect the completion of the call.

With continued reference to FIG. 1, an event detection circuit 34 is suitably employed to monitor the magnitude of the loop current in DC current sink circuit 32, to thereby detect an off hook condition of an extension telephone device (e.g., by detecting a change in the loop current as a result of an extension off hook condition).

With continued reference to FIG. 1, many conventional DAAs are configured such that off hook relay circuit 26 is in series with the incoming telephone line, as shown in FIG. 1, as opposed to locating the off hook relay within the current sink loop connected to bridge 30. Consequently, for those DAAs wherein the off hook relay circuit is located in the incoming telephone line as shown in FIG. 1, the DAA is typically only capable of detecting an extension telephone off hook condition when the modem is in the off hook condition (i.e., when off hook relay 26 is closed). Stated another way, it is necessary to establish a modem connection as a precondition to the ability of the DAA to detect certain external events, such as the off hook condition of an extension device, a hang up condition of a remote telephone, or the like. Moreover, the configuration of the off hook relay as shown in FIG. 1 generally precludes the DAA from detecting many of these important external events when the computer associated with the modem is off or if a modem connection does not exist.

Figure 2:
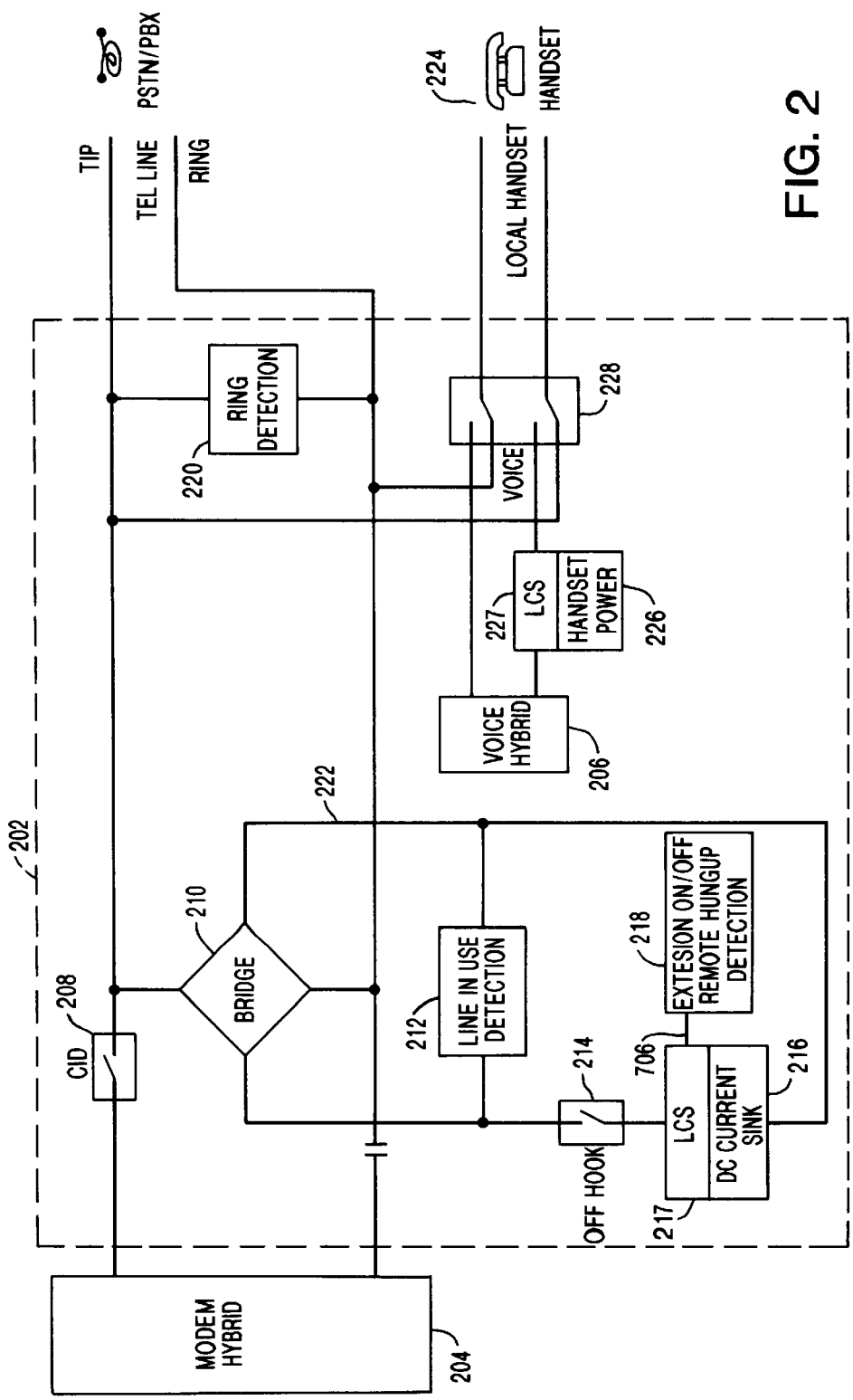
FIG. 2 is a schematic, functional block diagram of an enhanced DAA circuit illustrating an arrangement of voltage and current detection components which provides enhanced event detection functionality to a DAA.

Referring now to FIG. 2, an improved DAA 202 in accordance with the present invention suitably includes a caller ID relay 208, a ring detect circuit 220, a bridge 210, a bridge current loop circuit 222, a line in use detection circuit 212, an off hook relay 214, a DC current sink circuit 216, a loop current sense (LCS) circuit 217 and an extension/remote event detector circuit 218. In addition to performing many of the functions set forth in TIA/EIA-695, DAA 202 suitably supports many of the existing functions associated with conventional DAAs, such as isolating modem 204 and its associated local handset 224 from the high voltage environment of the PSTN.

With continued reference to FIG. 2, off hook relay 214 is suitably connected in series with current sink loop 222, as opposed to being disposed in series with the incoming tip and ring lines, as is the case with may prior art DAAs. This improvement has substantial implications, as discussed in greater detail below, in that it permits DAA 202 to detect various external events even when a modem connection is not extant (i.e., even when off hook relay 214 is open).

With continued reference to FIG. 2, those skilled in the art will appreciate that a caller ID (CID) signal is generally transmitted from the LEC between the first and second audible rings. In accordance with a preferred embodiment of the present invention, ring detect circuit 220 is suitably configured to detect an incoming call, whereupon DAA 202 is advantageously configured to capture the telephone number or other indicia associated with the incoming call, via ring detect circuit 220, CID circuit 208, or through any other convenient mechanism. Once the ID of the incoming call is captured, it can be compared with a look up table stored in memory associated with the modem, or otherwise evaluated to determine whether the modem desires to accept the incoming call. For example, a list of destinations from which the modem desires to accept calls, or a list of destinations from which the modem desires to reject calls, or both, may suitably be compiled and stored in memory, for example in the form of a look up table. When the ID of the incoming call is captured and compared to the look up table, the call may be accepted or rejected, as desired.

If the call is to be accepted, the controller (not shown) associated with modem 204 sends an appropriate signal to CID circuit 208, thereby closing the relay. The modem is also configured to transmit a signal to off hook relay circuit 214 to close the relay and thereby establish the call connection.

Once a call connection is established, bridge circuit 210 drops the line current, and converts a portion of the incoming signal to DC, creating a current loop in current loop circuit 222 which is detectable by the Central Office (CO), such that the CO can determine that the call connection has been made. The remaining AC component of the incoming signal is suitably applied to the modem hybrid circuit.

With continued reference to FIG. 2, DC current sink circuit 216 suitably comprises a line current sense detector 217 for detecting an off hook condition of modem 204, while circuit 226 suitably comprises a loop current sense detector 227 for detecting an off hook condition of handset 224. In accordance with a particularly preferred embodiment, if during a modem connection the user desires to integrate voice into the transmission, the user may press a suitable function key or otherwise interact with the modem (or its associated PC), for example by depressing a predetermined key on the keyboard associated with the PC. In this way, the SVD function may be implemented, causing the voice relay circuit 228 to integrate the handset into the modem connection.

In accordance with a particularly preferred embodiment, when LCS circuit 226 detects the off hook condition of local handset 224, DAA 202 suitably signals the modem controller to initialize the SVD function.

In a particularly preferred embodiment, line in use circuit 212 is suitably implemented using a TMOS or other suitable, inexpensive electronic component. This is in contrast to prior art systems, which typically detect an off hook condition of an extension telephone device using a comparator circuit. By integrating the TMOS circuit into line in use detection circuit 212, the need for a comparator circuit and its associated high cost is also eliminated. Moreover, the use of a TMOS or similar device draws very little current, for example on the order of 5 microamps, which further facilitates compliance with FCC Part 68.

Figure 3:
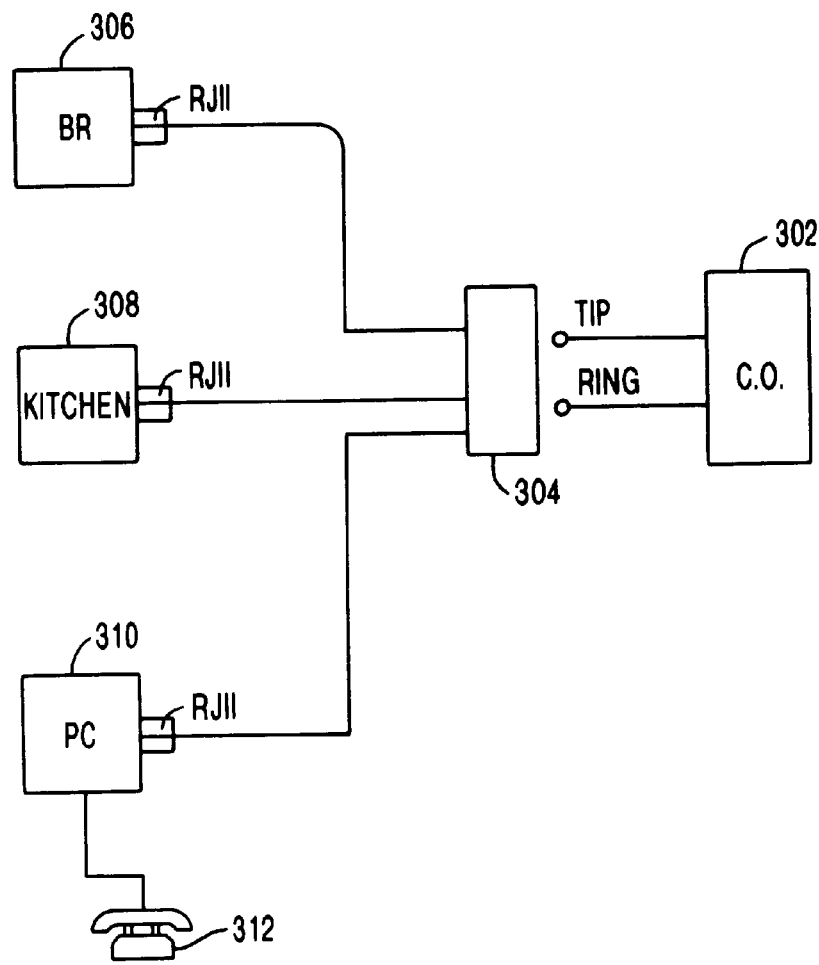
FIG. 3 is a schematic block diagram of a single telephone line having a plurality of telephone extensions.
Figure 4:
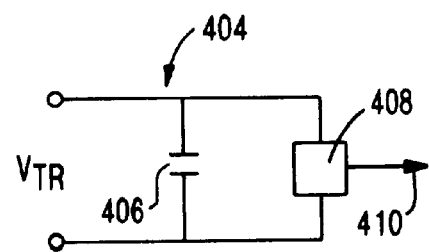
FIG. 4 is an exemplary schematic circuit diagram of a conventional voltage detection circuit.

In accordance with an alternate embodiment of the present invention, the subject DAA may be configured to detect an off hook condition of an extension telephone device even when the modem remains off hook. Referring now to FIG. 3, an incoming call from the Central Office (CO) 302 is suitably applied to a single telephone line 304 associated with a home, small office, or the like. In the illustrated embodiment, the single phone line 304 suitably has associated therewith a plurality of extensions, for example a first extension 306 located in a bedroom, a second extension 308 located in the kitchen, and a third extension 310 which is suitably dedicated to a PC having a local handset 312 associated with the PC. As discussed above, the PC and local handset 312 suitably share a common RJ-11 connection to the telephone line 304. When both the local modem and local handset associated with extension 310 are in the on hook condition, conventional DAAs associated with the modem at extension 310 are typically incapable of detecting an off hook condition of an extension handset, for example, in the kitchen. In order to detect an off hook condition on an extension telephone device while the local modem and local modem handset remain on hook, it may be desirable to incorporate a voltage detector circuit, for example as shown in FIG. 4, to detect a reduction in voltage (or current) as a result of an extension off hook condition. More particularly, an extension off hook detector circuit 404 suitably comprises a storage capacitor 406 corresponding to an analog memory component, a detector circuit 408 having an output signal 410 associated therewith, and suitably configured to detect the tip-to-ring voltage associated with telephone line 304, which voltage is known to drop upon the occurrence of an off hook condition of any extension telephone device. However, it will be appreciated that sensing circuits such as that shown in FIG. 4 are not readily capable of detecting when the extension telephone device goes back on hook and, hence, such circuits are of limited utility.

Returning now to FIGS. 2 and 5–8, a number of particularly preferred embodiments of the present invention suitably provide apparatus and techniques for detecting an off hook condition of an extension telephone device, as well as the return of that device to an on hook condition, regardless of whether the modem associated with the DAA is on hook or off hook.

Figure 5:
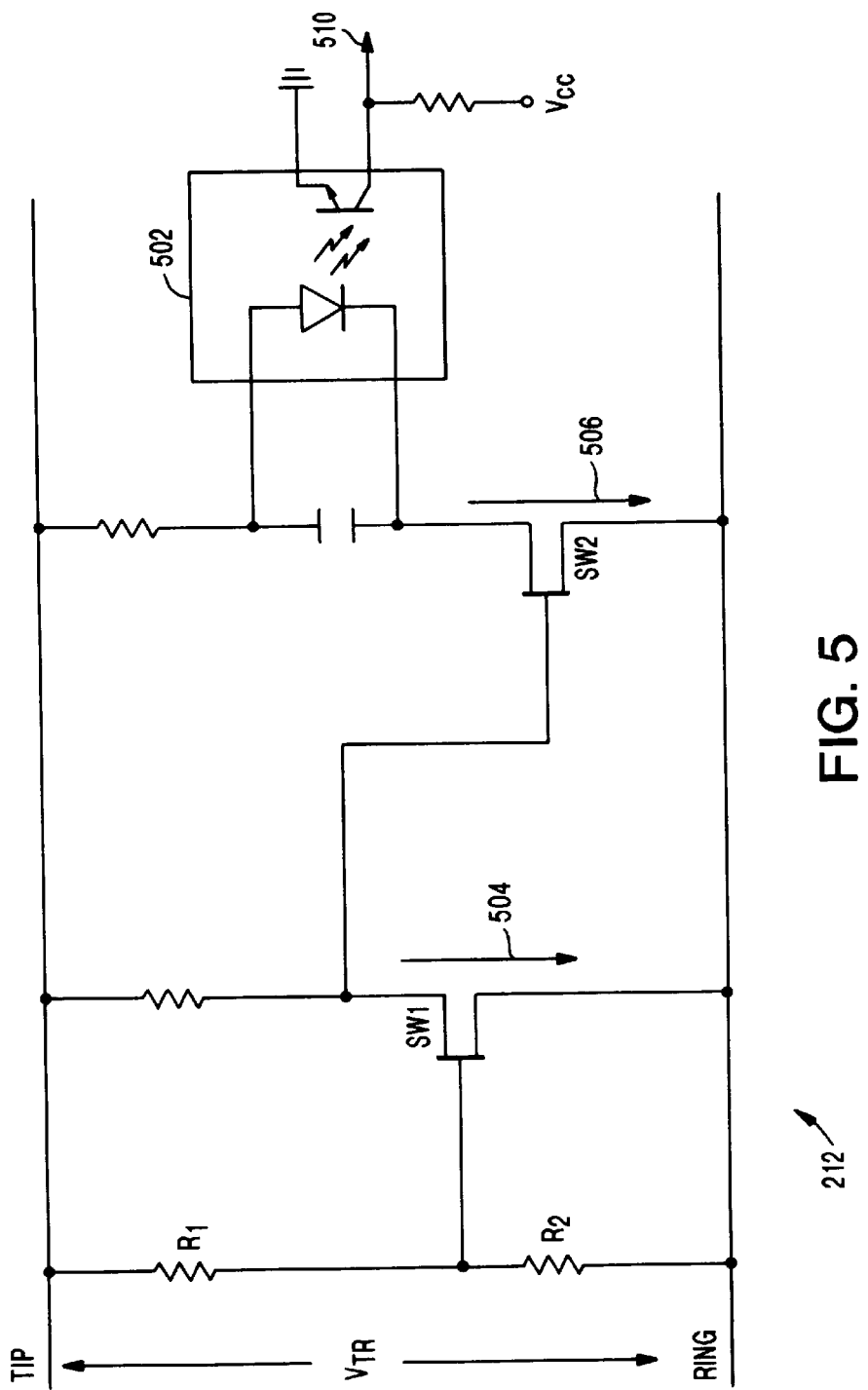
FIG. 5 is a schematic circuit diagram of an exemplary line in use detection circuit.
Figure 6:
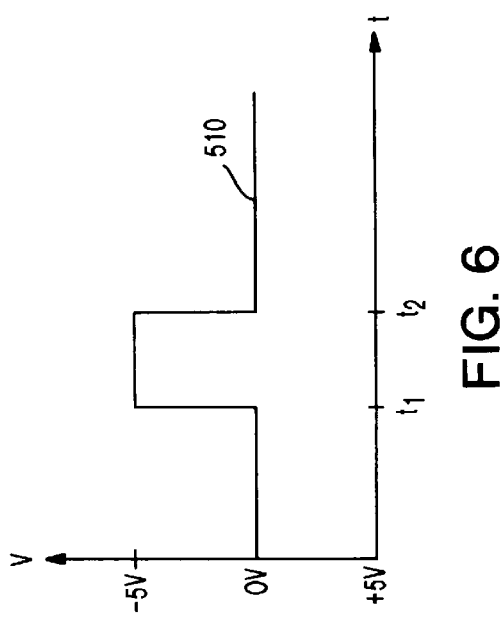
FIG. 6 is a graphical depiction of the output signal generated by the line in use circuit of FIG. 5.

With reference now to FIGS. 2 and 5–6, line in use detection circuit 212 is suitably configured to detect tip-toring voltage (or a scaled component thereof, for example within current loop 222. Line in use circuit 212 is also configured to generate an output signal 510 which, in the illustrated embodiment, is essentially a binary output signal. Output signal 510 is suitably applied to the modem controller (not shown) to indicate to the controller whether the line is in use, i.e., whether any extension device is off hook, as described in greater detail below.

With continued reference to FIGS. 2 and 5–6, circuit 212 suitably comprises respective first and second voltage divider resistors R1 and R2, respective first and second switches SW1 and SW2, respective current paths 504 and 506, and an opto-isolator element 502. It should be appreciated that the values of resistors R1 and R2 are suitably selected to ensure that DAA 202 may be employed in conjunction with a wide variety of telephones, telephone lines, and telephone systems (i.e., PBX, PSTN, public telephones, and the like) to effect a change in output signal 510 upon a drop in tip-to-ring voltage $V_{tr}$. With specific reference to FIGS. 5 and 6, output signal 510 applied to the modem controller is suitably high when no extension devices are in the off hook condition, whereas output signal 510 is suitably low when any extension (e.g., extension 306 or 308 in FIG. 3) is in the off hook condition. In contrast to the voltage detection circuit illustrated schematically in FIG. 4, the line in use detection circuit 212 shown in FIG. 5 follows $V_{tr}$ in essentially real time, i.e., without the delay occasioned by capacitor 406. When no extensions are off hook, $V_{tr}$ is high, such that SW1 is closed, causing current to flow through path 504. As a result, SW2 remains open, such that no current flows through path 506. With no current flowing through path 506, the opto-element 502 remains disabled, such that output signal 510 is pulled high. When an extension telephone device goes off hook, causing a drop in $V_{tr}$, SW1 opens, terminating the current flow through path 504. As a result, SW2 closes, producing current flow through path 506. The current flow activates opto-element 502, energizing the LED associated with the opto-element, such that output signal 510 is driven low. This phenomena is graphically illustrated in FIG. 6, where time $t_1$ corresponds to an extension telephone device going off hook, and the interval between times $t_1$ and $t_2$ corresponds to the period in which an extension telephone device remains off hook.

In this way, the subject DAA set forth in FIG. 2 and as explained above in conjunction with FIG. 5 is capable of communicating to the modem controller a signal (signal 510) any time an extension telephone device goes off hook, while modem 204 is on hook. Moreover, it will be appreciated that when the modem is off hook, i.e., during a modem connection, the modem connection is typically terminated when an extension telephone device goes off hook. This is analogous to a situation where a user of a PC (i.e., PC 310 in FIG. 3) is involved in an online session (e.g., with an external ISP), and during the modem session, someone else in the house unwittingly picks up a telephone in the kitchen (extension 308) or in the bedroom (extension 306). As a result, the modem connection is typically terminated, as distinguished from the situation where handset 312 may go off hook without terminating the modem session inasmuch as handset 312 and modem 310 enjoy the same RJ-11 connection to the telephone line. Notwithstanding the fact that the modem session may be terminated when an extension telephone set goes off hook, it may nonetheless be desirable to detect the off hook condition of an extension telephone set during a modem connection, as described below in conjunction with FIG. 7, so that the PC user may be apprised of the reason for the termination of his modem connection; that is, it may be desirable for the PC to signal the PC operator that the connection is terminated because of an off hook condition at an extension, so that the PC operator does not erroneously presume that the connection was terminated because of an ISP failure, hard drive failure, line failure, or some other reason.

Figure 7:
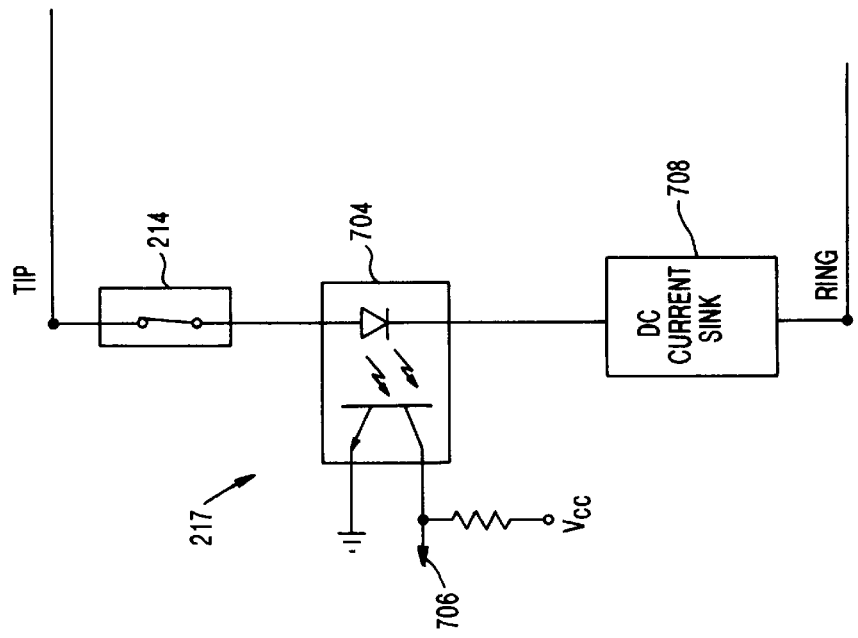
FIG. 7 is a schematic diagram of a exemplary embodiment of a line current sense circuit.

Referring now to FIG. 7, the loop current sense (LCS) circuit 217 of current sink 216 is suitably employed to detect an extension off hook condition when the modem is off hook, i.e., during a modem connection. The loop current sense circuit 217 suitably comprises an opto-isolator element 704 configured to generate an output signal 706 indicative of the state of loop current sense detector circuit 217. More particularly, the output of opto-isolator 704 is suitably pulled high (i.e., pulled to $V_{cc}$). Thus, when modem off hook relay 214 is open, i.e., when the modem is in the on hook condition, output signal 706 is suitably high. When the modem goes off hook, relay 214 closes, producing a current flow through the opto-isolator 704, thereby driving output signal 706 low. With momentary reference to FIG. 8, output signal 706 is suitably high prior to time $t_A$, i.e., while the modem is on hook. When the modem goes off hook at time $t_A$, output signal 706 drops, as described above. If the modem thereafter stays off hook, it is desirable to detect when an extension telephone device goes off hook while the modem remains in the off hook condition.

Figure 8:
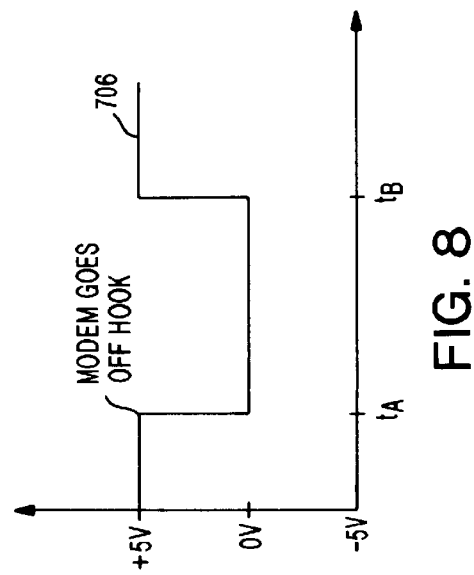
FIG. 8 is a graphical representation of an exemplary output of the line current sense circuit shown in FIG. 7.

With continued reference to FIGS. 2 and 7–8, time $t_B$ suitably corresponds to an extension telephone device going off hook while the modem remains off hook. Surprisingly, output signal 706 goes back high, even though the modem remains off hook (i.e., even though relay 214 remains closed). Of course, if the modem were to go back on hook, i.e., if relay 214 were to open, output signal 706 would also go back to the high condition, inasmuch as the current would stop flowing through opto-device 704, thereby driving output signal 706 high.

As alluded to above, output signal 706 is nonetheless driven back to the high state when an extension telephone device goes off hook while the modem remains off hook. More particularly, if the modem is off hook but all other extensions on the same telephone line are on hook, the modem will generally draw a substantially constant current, for example on the order of 30 milliamps. If an extension telephone device then goes off hook, the combined current drawn by both telephone devices will be approximately equal to twice the current drawn by either device, but in reality will likely be slightly less than 60 microamps. This is analogous to the phenomenon one experiences when taking a shower in a home, whereupon a family member turns on the water in the sink located in the same bathroom as the shower. Although the water supply pressure (analogous to voltage) remains substantially constant, and further although the amount of water coming out of the shower head (analogous to modem current) is not adjusted, when the water in the sink is turned on (analogous to an extension telephone device going off hook), the person taking a shower will typically notice a slight reduction in the rate of flow of the shower water.

Thus, although perhaps counter-intuitive, when an extension goes off hook while the modem is off hook, the current level drawn by the modem actually goes down slightly; this reduction in current drawn by the modem causes opto-element 704 to cease activation, thereby sending output signal 706 back high. When the output signal 706 goes back high, as shown in FIG. 8, this is detected by event detector circuit 218.

In accordance with a preferred embodiment of the present invention, extension on/off remote hangup detector circuit 218, upon detecting the return of output signal 706 to the high state, can effectively discriminate between: (i) output signal 706 returning to the high state as a result of the modem going back on hook; and (ii) output signal 706 going back to the high state as a result of an extension telephone device going back on hook. In accordance with a particularly preferred embodiment of the present invention, extension detection circuit 218 may effectively discriminate between the aforementioned conditions based on, for example, an output signal generated from relay circuit 214 which affirmatively indicates whether the modem is on hook or off hook. In particular, if output signal 706 returns to the high state and the modem remains off hook, DAA 202 may suitably conclude that the return of signal 706 to the high state resulted from an extension telephone device going back on hook. If, on the other hand, signal 706 returns to the high state and it is determined that off hook relay circuit 214 was recently opened, DAA 202 may suitably conclude that the return of signal 706 to the high state resulted from the modem going back on hook as opposed to resulting from an extension telephone device going back on hook.

In accordance with a further aspect of the present invention, extension on/off remote hangup circuit 218 is also suitably configured to detect a remote hangup condition, i.e., when the telephone device initiating an incoming call hangs up. More particularly, when the remote telephone device hangs up, the CO typically interrupts the DC component of the incoming signal for a brief period, for example on the order of 180 to 200 milliseconds. During this brief window of a DC null condition, the current loop line 222 goes idle. This idle condition may be suitably detected by LCS circuit 217, for example as described above. When a change in state in the output of LCS circuit 217 is effected as a result of a remote hangup event, detector circuit 218 may be suitably configured to discriminate among the various possible causes of a change in state of the output signal produced by LCS circuit 217.

More particularly, a change in state of the output of LCS circuit 217 could be caused by the DC null occasioned by a remote hangup, an extension off hook condition while the modem is off hook, or a return of an off hook modem to the on hook condition, as discussed above. By tracking the state of the modem (i.e., either on hook or off hook) and of the off hook/on hook condition of extension telephone devices, DAA 202 may suitably infer whether a change in state of the output of LCS 217 is attributable to a remote hangup or, alternatively, to another event.

In accordance with an alternate embodiment, remote hangup detector circuit 218 may also be configured to detect a remote hangup condition by detecting the presence of a DC null condition in current loop 222 for an anticipated window in the range of 180 to 200 milliseconds. This may be conveniently implemented in various ways using software, for example using a counter or other convenient technique. In addition, detector circuit 218 may be configured to detect the DC null condition via a hardware implementation, for example by detecting a low voltage condition (corresponding to the DC null interval), and thereafter a return to a higher relative voltage condition upon termination of the DC null condition.

In yet a further embodiment, detector circuit 218 may be configured to detect a remote hangup condition by detecting a reversal in the polarity of the $V_{tr}$. That is, many COs signal a remote hangup by reversing the tip-to-ring polarity, either in lieu of or in addition to a brief cessation of the DC signal. In this case, detector circuit 218 may be suitably configured to search for a polarity reversal, for example by detecting a zero crossing of the DC voltage in current loop 222.

While the present invention has been described with reference to certain preferred embodiments, it will be appreciated that various substitutions, changes, modifications, omissions, and enhancements may be made without departing from the spirit thereof. For example, the circuit elements shown in the Figures are illustrative of the invention, but those skilled in the art will appreciate that the functionality described herein may be implemented in virtually any convenient manner. Accordingly, it is intended that the scope of the present invention not be limited by such a description but be fully coextensive with the broadest interpretation allowable for the appended claims.

I claim:

1. A method for detecting a number of events associated with an incoming telephone line, a modem associated with said incoming telephone line, and an extension telecommunication device associated with said incoming telephone line, said method comprising the steps of:

providing a data access arrangement (DAA) device as an interface between said modem and said incoming telephone line;

monitoring, with said DAA device, a voltage and a current associated with said incoming telephone line;

detecting, in response to changes in said voltage and said current, an off-hook state and an on-hook state of said extension telecommunication device regardless of whether said modem is in an on-hook or an off-hook state, said detecting step being performed by said DAA device;

generating an output signal indicative of said off-hook state of said extension telecommunication device, said output signal being generated by said DAA device for use by said modem;

detecting a hang-up state of a remote telecommunication device configured to communicate with said DAA device over said incoming telephone line; and discriminating between on-hook/off-hook events related to said modem, said extension telecommunication device, and said remote telecommunication device, said discriminating step being performed when said modem is in an off-hook state.

2. A method according to claim 1, further comprising the step of generating an output report for use by a computing device operatively connected to said modem, said output report indicating said hang-up state of said remote telecommunication device.

3. A data access arrangement (DAA) device for interfacing a modem with an incoming telephone line of the type including a tip node and a ring node characterized by a tip-to-ring voltage $V_{tr}$, said DAA comprising:

a bridge circuit interposed between said ring node and said tip node;
a line-in-use circuit connected to said bridge circuit, said line-in-use circuit being configured to detect an off-hook state of an extension telecommunication device, to detect when said extension telecommunication device is returned to an on-hook state, and to operate when said modem is in an on-hook state;

an on-hook/off-hook relay connected to said bridge circuit;

a line current sense (LCS) circuit connected to said on-hook/off-hook relay, said LCS circuit being configured to detect said off-hook state of said extension telecommunication device and a hang-up state of a remote telecommunication device when said modem is off-hook, wherein said LCS circuit is further configured to detect when said extension telecommunication device is returned to said on-hook state; and a current sink circuit connected to said LCS circuit.

4. A DAA device according to claim 3, wherein:

said on-hook/off-hook relay is in a closed position and said current sink circuit draws a current from said bridge circuit through said on-hook/off-hook relay when said modem is in an off hook state; and said LCS circuit is configured to detect changes in said current between said on-hook/off-hook relay and said current sink circuit, wherein said changes in said current are responsive to changes in said off-hook and on-hook states of said extension telecommunication device and said hang-up state of said remote telecommunication device.

5. A DAA device according to claim 4, further comprising an extension on/off and remote hang-up detection (ERHD) circuit connected to said LCS circuit, said ERHD circuit being configured to discriminate between said changes in said current resulting from said off-hook and on-hook states of said extension telecommunication device from said changes in said current resulting from said hang-up state of said remote telecommunication device.

6. A data access arrangement (DAA) device for interfacing a modem with an incoming telephone line of the type including a tip node and a ring node characterized by a tip-to-ring voltage $V_{tr}$, said DAA comprising:

a bridge circuit interposed between said ring node and said tip node;

a line-in-use circuit connected to said bridge circuit, said line-in-use circuit being configured to detect an off-hook state of an extension telecommunication device, to detect when said extension telecommunication device is returned to an on-hook state, and to operate when said modem is in an on-hook state;

a voice relay circuit, wherein said voice relay circuit shares a connection to said incoming telephone line with said modem; and a local telecommunication device connected to said voice relay circuit, wherein said voice relay circuit connects said local telecommunication device to said incoming telephone line when said modem is in a data and fax mode, and said line-in-use circuit is configured to detect an off-hook state of said local telecommunication device and to detect when said local telecommunication device is returned to an on-hook state.

7. A DAA device according to claim 6, further comprising:

a voice hybrid circuit connected to said voice relay circuit, wherein said voice relay circuit connects said voice hybrid circuit to said local telecommunication device when said modem is in a voice, telephone answering machine, or speaker phone mode;

a loop current sense (LCS) circuit connected between said voice hybrid and said voice relay circuit, wherein said LCS circuit is configured to detect an off-hook state of said local telecommunication device, and said LCS circuit is configured to detect when said local telecommunication device is returned to an on-hook state; and and a handset power supply circuit connected to said LCS circuit.

8. A data access arrangement (DAA) device for connecting a modem to an incoming telephone line, said DAA device comprising:

a bridge circuit connected to said incoming telephone line;

a current sink circuit connected to said bridge circuit; and a first line current sense (LCS) circuit connected between said bridge circuit and said current sink circuit, said first LCS circuit being configured to produce an output signal indicative of an off-hook state or an on-hook state of an extension telecommunication device and indicative of a hang-up state of a remote telecommunication device, wherein said first LCS circuit is configured to operate when said modem is in an off-hook state.

9. A DAA device according to claim 8, wherein:

said current sink circuit draws a DC loop current flow from said incoming telephone line through said bridge circuit when said modem is in said off-hook state, and said first LCS circuit is configured to detect changes in said DC loop current, wherein said changes in said DC loop current are responsive to changes in said off-hook and on-hook states of said extension telecommunication device and said hang-up state of said remote telecommunication device.

10. A DAA device according to claim 9, wherein said DC loop current between said bridge circuit and said current sink is at a first level when said extension telecommunication device is in said on-hook state and at a second level, lower than said first level, when said extension telecommunication device is in an off-hook state.

11. A DAA device according to claim 9, wherein said first LCS circuit comprises an opto-isolator configured to produce said output signal, wherein said output signal is high when said modem is in said on-hook state, high when said modem is in said off-hook state and said extension telecommunication device is in said off-hook state, and low when said modem is in said off-hook state and said extension telecommunication device is in said on-hook state.

12. A DAA device according to claim 9, further comprising an extension on/off and remote hang-up detection (ERHD) circuit connected to said first LCS circuit, wherein said ERHD circuit is configured to discriminate between said changes in said DC loop current resulting from off-hook and on-hook states of said extension telecommunication device and said hang-up state of said remote telecommunication device.

13. A DAA device according to claim 12, wherein said ERHD circuit is configured to detect an interruption in said DC loop current between said bridge circuit and said current sink, wherein said interruption in said DC loop current is for a period of time.

14. A DAA device according to claim 13, wherein said EHRD circuit is configured to detect the presence of a DC null condition in said DC loop current for said period of time, wherein said period of time is within the range of 180 to 200 milliseconds.

15. A DAA device according to claim 8, further comprising a line-in-use circuit connected to said bridge circuit, said line-in-use circuit being configured to produce a first output signal indicative of an on-hook state of said extension telecommunication device and a second output signal indicative of an off-hook state of said extension telecommunication device, wherein said line-in-use circuit is configured to operate when said modem is in an on-hook state.

16. A DAA device according to claim 8, further comprising:

a voice relay circuit coupled to said incoming telephone line;

a local telecommunication device coupled to said voice relay circuit;

a voice hybrid circuit coupled to said voice relay circuit; and a second LCS circuit operatively coupled between said voice hybrid circuit and said voice relay circuit, said second LCS circuit being configured to detect an off-hook state of said local telecommunication device and to detect when said local telecommunication device is returned to an on-hook state, wherein said voice relay circuit connects said local telecommunication device to said voice hybrid circuit and said second LCS circuit when said modem is in a voice mode, a telephone answering machine mode, or a speaker phone mode.

17. A DAA device according to claim 16, wherein:

said voice relay circuit connects said local telecommunication device to said incoming telephone line and disconnects said local telecommunication device from said voice hybrid circuit and said second LCS circuit when said modem is in a data and fax mode; and said line-in-use circuit is configured to detect an off-hook state of said local telecommunication device and to detect when said local telecommunication device is returned to an on-hook state.

18. A data access arrangement (DAA) device for interfacing a modem with an incoming telephone line, said DAA comprising:

a bridge circuit connected to said incoming telephone line;

an on-hook/off-hook relay connected to said bridge circuit;

a current sink circuit connected to said on-hook/off-hook relay; and means for detecting an on-hook state and an off-hook state of an extension telecommunication device regardless of whether said modem is in an on-hook state or an off-hook state, wherein said means for detecting is configured to detect a hang-up state of a remote telecommunication device when said modem is in an off-hook state.

19. A DAA device according to claim 18, wherein said means for detecting comprises:

a line-in-use circuit connected to said bridge circuit, said line-in-use circuit being configured to detect said off-hook state and said on-hook state of said extension telecommunication device when said modem is in said on-hook state;

a line current sense (LCS) circuit connected between said on-hook/off-hook relay and said current sink circuit; and an extension on/off and remote hang-up detection (ERHD) circuit connected to said LCS circuit, wherein said LCS circuit and said ERHD circuit are configured to detect said off-hook state and said on-hook state of said extension telecommunication device and said hang-up state of said remote telecommunication device when said modem is in an off-hook state.

20. A DAA device according to claim 19, wherein:

said on-hook/off-hook relay is in an open position and said LCS circuit and said ERHD circuit are inoperative when said modem is in said on-hook state; and said line-in-use circuit detects changes in voltages in said incoming telephone line indicative of said off-hook state and said on-hook state of said extension telecommunication device when said modem is in said on-hook state.

21. A DAA device according to claim 19, wherein:

said on-hook/off-hook relay is in a closed position and said current sink draws a current from said incoming telephone line through said bridge circuit when said modem is in said off-hook state;

said LCS circuit and said ERHD circuit detect changes in said current from said incoming telephone line to said current sink indicative of said off-hook state and said on-hook state of said extension telecommunication device and said hang-up state of said remote telecommunication device when said modem is in said off-hook state.

* * * * *